(12) United States Patent
Kay et al.

(10) Patent No.: US 10,012,247 B2
(45) Date of Patent: Jul. 3, 2018

(54) VARIABLE BOOSTER FOR HYBRID PNEUMATIC REGENERATIVE SYSTEM

(71) Applicant: Harris Corporation, Melbourne, FL (US)

(72) Inventors: Steven D. Kay, Greenlawn, NY (US); Jeffrey S. Shapiro, Long Beach, NY (US); Robert E. Hammerquist, Huntington, NY (US); Steven A. Hartney, Farmingdale, NY (US)

(73) Assignee: Harris Corporation, Melbourne, FL (US)

(*) Notice: Subject to any disclaimer, the term of this patent is extended or adjusted under 35 U.S.C. 154(b) by 0 days.

(21) Appl. No.: 15/367,980

(22) Filed: Dec. 2, 2016

(65) Prior Publication Data
US 2018/0156250 A1 Jun. 7, 2018

(51) Int. Cl.
*B60K 3/04* (2006.01)
*B60K 7/00* (2006.01)
(Continued)

(52) U.S. Cl.
CPC ............... *F15B 21/14* (2013.01); *B60K 6/12* (2013.01); *B60T 1/08* (2013.01); *B60T 1/093* (2013.01);
(Continued)

(58) Field of Classification Search
CPC .................................... B60K 3/04; B60K 7/00
See application file for complete search history.

(56) References Cited

U.S. PATENT DOCUMENTS 2,544,606 A 3/1951 Mallory
3,151,806 A 10/1964 Whitfield
(Continued)

FOREIGN PATENT DOCUMENTS

| CN | 105539390 A | 5/2016 |
| WO | 8000237 A1 | 2/1980 |
| WO | 2013079987 A1 | 6/2013 |

OTHER PUBLICATIONS

U.S. Appl. No. 13/043,091, filed Mar. 8, 2011 (Not Published).
(Continued)

*Primary Examiner* — Bryan A Evans
(74) *Attorney, Agent, or Firm* — Edell, Shapiro & Finnan, LLC

(57) ABSTRACT

A variable booster device of a pneumatic regenerative system of a motorized vehicle is in fluid communication with a pneumatic device of the system. The variable booster device includes a main body and a plate slidingly coupled to the main body. The main body includes an inlet, an outlet, and an interior cavity. The plate is reconfigurable between a first configuration, where the outlet is a first size, and a second configuration, where the outlet is a second size. The variable booster device pressurizes the air a first amount when the plate is in the first configuration and pressurizes the air a second amount when the plate is in the second configuration, where the second amount is greater than the first amount. Disposed within the interior cavity is a first helical screw rotor and a second helical screw rotor. The two helical screw rotors are intermeshed with one another. The pressurized air is fed from the outlet of the variable booster device to the pneumatic device of the pneumatic regenerative system to be further pressurized by the pneumatic device and then stored for later use in the system.

20 Claims, 8 Drawing Sheets

(51) Int. Cl.
    *F15B 21/14*    (2006.01)
    *F15B 1/027*    (2006.01)
    *F15B 11/064*   (2006.01)
    *F15B 11/08*    (2006.01)
    *F04C 18/16*    (2006.01)
    *B60K 6/12*     (2006.01)
    *B60T 1/093*    (2006.01)
    *B60T 1/08*     (2006.01)

(52) U.S. Cl.
    CPC .............. *F04C 18/16* (2013.01); *F15B 1/027* (2013.01); *F15B 11/064* (2013.01); *F15B 11/08* (2013.01); *F15B 2211/7058* (2013.01)

(56) References Cited

U.S. PATENT DOCUMENTS

| | | | |
|---|---|---|---|
| 3,379,008 A | | 4/1968 | Manganaro |
| 3,513,929 A | | 5/1970 | Kim |
| 3,612,202 A | | 10/1971 | Moon, Jr. et al. |
| 3,704,760 A | | 12/1972 | Maruyama |
| 3,738,780 A | * | 6/1973 | Edstrom ............... F04C 28/125 417/281 |
| 3,826,096 A | | 7/1974 | Hrusch |
| 3,936,239 A | | 2/1976 | Shaw |
| 3,986,575 A | | 10/1976 | Eggmann |
| 4,042,310 A | | 8/1977 | Schibbye et al. |
| 4,123,910 A | | 11/1978 | Ellison, Sr. |
| 4,132,283 A | | 1/1979 | McCurry |
| 4,230,075 A | * | 10/1980 | Lowther ............... F02B 3/08 123/39 |
| 4,355,508 A | | 10/1982 | Blenke et al. |
| 4,798,053 A | | 1/1989 | Chang |
| 4,842,501 A | | 6/1989 | Schibbye et al. |
| 5,460,239 A | | 10/1995 | Jensen |
| 5,549,174 A | | 8/1996 | Reis |
| 5,724,811 A | | 3/1998 | Gibby |
| 5,847,470 A | | 12/1998 | Mitchell |
| 5,853,229 A | | 12/1998 | Willmann et al. |
| 5,984,432 A | | 11/1999 | Otomo et al. |
| 6,044,924 A | | 4/2000 | Adli |
| 6,170,587 B1 | | 1/2001 | Bullock |
| 6,311,797 B1 | | 11/2001 | Hubbard |
| 6,353,786 B1 | | 3/2002 | Yamada et al. |
| 6,508,324 B1 | | 1/2003 | Conley, Jr. |
| 7,147,078 B2 | | 12/2006 | Teslak et al. |
| 7,461,626 B2 | | 12/2008 | Kimes |
| 8,013,567 B2 | | 9/2011 | Windsor |
| 8,540,180 B2 | | 9/2013 | Sobas |
| 8,862,356 B2 | | 10/2014 | Miller |
| 2006/0000659 A1 | | 1/2006 | Teslak et al. |
| 2006/0225941 A1 | | 10/2006 | Cole |
| 2007/0163819 A1 | | 7/2007 | Richter et al. |
| 2008/0251302 A1 | | 10/2008 | Lynn et al. |
| 2008/0297103 A1 | | 12/2008 | Windsor |
| 2009/0301796 A1 | | 12/2009 | Wedderburn, Jr. et al. |
| 2010/0151989 A1 | | 6/2010 | Read |
| 2010/0270097 A1 | | 10/2010 | Prakash et al. |
| 2011/0011663 A1 | | 1/2011 | Hebrard |
| 2011/0049909 A1 | | 3/2011 | Domes |
| 2011/0062276 A1 | | 3/2011 | Sobas |
| 2011/0156402 A1 | | 6/2011 | Khymych |
| 2012/0325573 A1 | | 12/2012 | Miller |

OTHER PUBLICATIONS

U.S. Appl. No. 13/043,091—office action dated Feb. 7, 2013, USPTO.
U.S. Appl. No. 13/043,091—final office action dated Jun. 5, 2013, USPTO.
U.S. Appl. No. 13/043,091—office action dated Oct. 1, 2013, USPTO.
U.S. Appl. No. 13/043,091—final office action dated May 19, 2014, USPTO.
U.S. Appl. No. 13/043,091—office action dated Nov. 26, 2014, USPTO.
U.S. Appl. No. 13/043,091—final office action dated Jul. 20, 2015, USPTO.
U.S. Appl. No. 13/043,091—office action dated Jan. 15, 2016, USPTO.
U.S. Appl. No. 13/043,091—office action dated Oct. 25, 2016, USPTO.
Tardec Quarterly, "Partnering with Industry and Academia", Warren, MI, Oct.-Dec. 2008 (40 pages).
European Search Report in corresponding European Patent Application No. 17001919.4, dated Apr. 30, 2018.

* cited by examiner

VARIABLE BOOSTER FOR HYBRID PNEUMATIC REGENERATIVE SYSTEM

FIELD OF THE INVENTION

The present invention relates to pneumatic-based regenerative systems. More specifically, the present invention relates to a pneumatic-based regenerative system equipped with a variable compression booster compressor, where the variable compression booster compressor configured to modulate the braking torque provided by the pneumatic-based regenerative system.

BACKGROUND

Regenerative vehicle power augmentation systems are typically applied to the start/stop cycles of vehicles to improve the overall fuel efficiency of the vehicle. A regenerative vehicle power augmentation system captures braking energy, which is otherwise released as heat into the environment, during a braking event of the vehicle, where the captured braking energy is then stored. The stored energy is later used to supplement engine power to assist in acceleration.

In recent years, hybrid electric vehicles have achieved commercial success in consumer automotive markets. This type of vehicle can improve overall energy efficiency by recapturing energy used by the vehicle's braking system, which is typically released to the environment as wasted energy for conventional (i.e., non-hybrid) vehicles. The captured energy is stored as electrical energy in batteries, which can be released to the drive system at appropriate times to reduce the load on the internal combustion engine of the vehicle. Certain types of hybrid electric vehicles can achieve economy improvements of 30% or more.

While hybrid electric vehicles have gained popularity for consumer vehicles (e.g., sedans, minivans, SUVs, etc.), such vehicles are limited in their ability to provide desirable fuel economies for larger and heavier vehicles, such as military vehicles, large package transport vehicles, and even railway vehicles. The high life-cycle cost associated with required battery replacements (and the resulting carbon footprint associated with disposing or recycling used batteries) as well as the larger and heavier battery that is required for larger and heavier vehicles makes a hybrid electric system undesirable for such larger vehicles. In addition, the limits in power delivery of battery systems also render the hybrid electric technology undesirable for use with vehicles that are larger and heavier in relation to typical consumer vehicles.

Vehicles equipped with hybrid hydraulic systems have also been utilized for motorized vehicles, in which a compressed gas is used to pump hydraulic fluid into a hydraulic motor to provide assistance to the combustion engine of the vehicle. However, there are environmental concerns with such systems, such as hydraulic fluid leakage, as well as economic costs associated with the additional weight and maintenance associated with such systems. In addition, the finite working volume of incompressible hydraulic fluid limits the speed of the drive circuit (due to viscous losses and heating), and limits the endurance and operating temperature of the system.

Because accumulators charged with air build pressure progressively, and braking torque is proportional to this pressure, the driver's demand and the system's capacity for braking torque may vary across a broad range of conditions and energy storage levels. Therefore, it is desired to have a method of modulating braking torque by varying the system compression ratio.

SUMMARY

A variable booster device of a pneumatic regenerative system of a motorized vehicle is in fluid communication with a pneumatic device of the system. The variable booster device includes a main body and a variably opening outlet (e.g., a plate slidingly coupled to the main body). The main body includes an inlet, an outlet, and an interior cavity. The plate is reconfigurable between a first configuration, where the outlet is a first size, and a second configuration, where the outlet is a second size. The variable booster device pressurizes the air a first amount when the plate is in the first configuration and pressurizes the air a second amount when the plate is in the second configuration, where the second amount is greater than the first amount. Disposed within the interior cavity is a first helical screw rotor and a second helical screw rotor. The two helical screw rotors are intermeshed with one another, such that the first screw rotor rotates in a first direction and the second screw rotor rotates in an opposite second direction to compress air that enters the variable booster device through the inlet.

BRIEF DESCRIPTION OF THE DRAWINGS

Like reference numerals have been used to identify like elements throughout this disclosure.

DETAILED DESCRIPTION

Figure 1:
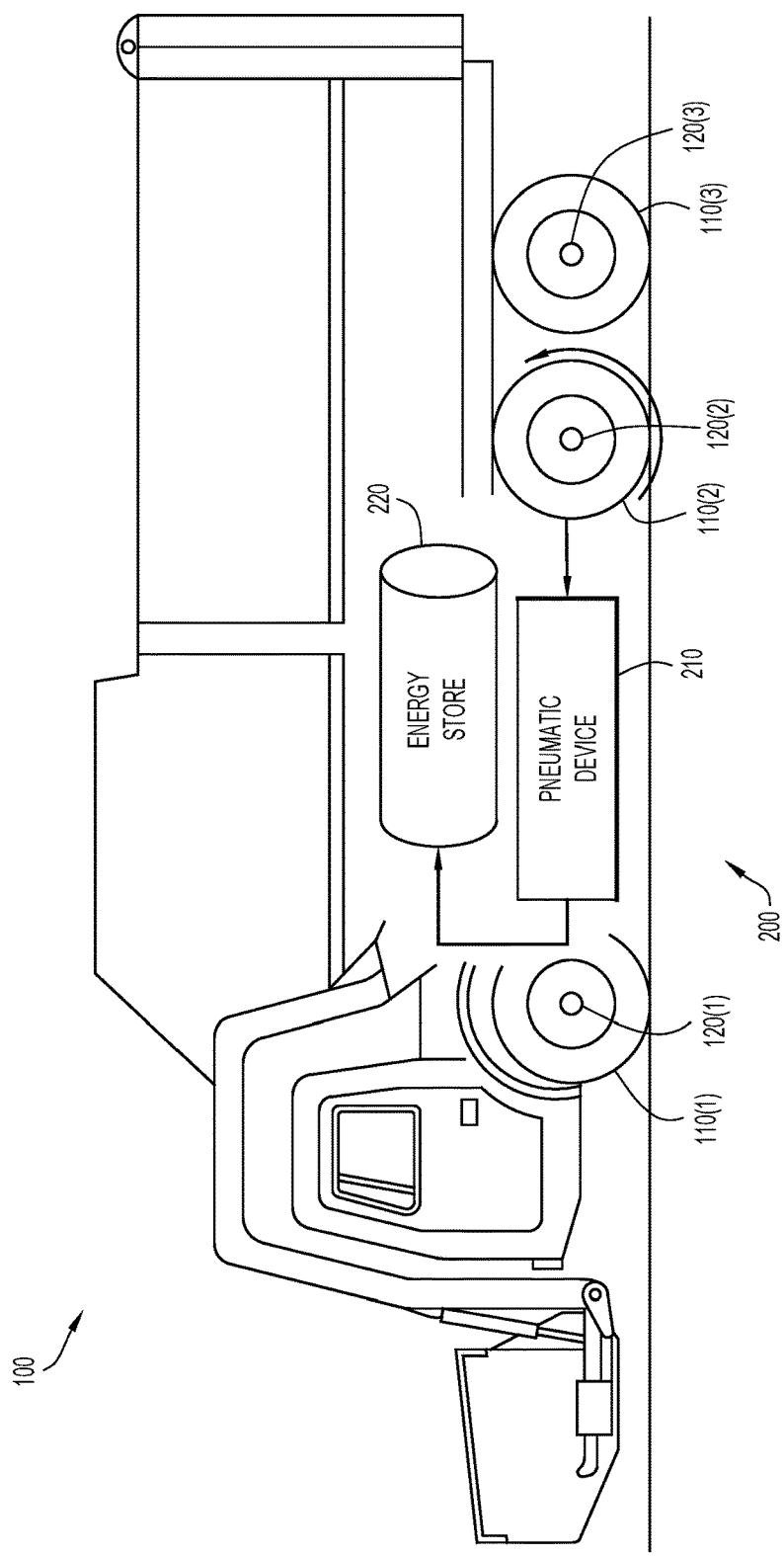
FIG. 1 illustrates an example embodiment of a medium to heavy duty motorized vehicle utilizing the hybrid pneumatic regenerative system in accordance with the present invention.

A hybrid pneumatic regenerative system for a motorized vehicle comprises a pneumatic device configured to both draw air from the environment and compress the air for storage, and later, expand the stored high pressure air and release it into the environment. Thus, the pneumatic device of the present invention is operable as an air compressor and as a pneumatic (air) motor. When operating as an air compressor, the pneumatic device draws air from the environment, compresses the air, and directs pressurized air to an accumulator during a braking operation of the vehicle, where the pressurized air is stored at a suitable elevated pressure (i.e., a pressure that is above the ambient air pressure or air pressure of the surrounding environment) until it is used. When operating as a pneumatic motor, the pneumatic device draws the pressurized air stored within the accumulator, where it is expanded and used as a working fluid for driving/operating the pneumatic motor. The pneumatic device is coupled with a drive shaft of the motorized vehicle to facilitate rotation of the drive shaft to propel the motorized vehicle. A main drive mechanism is also coupled to the drive shaft, and the pneumatic device is operable in combination with the main drive mechanism to reduce the energy requirements of the drive mechanism during acceleration of the motorized vehicle.

The hybrid pneumatic regenerative system of the present invention further includes a variable booster device coupled to the pneumatic device. The variable booster device is configured to modulate the braking torque provided by the hybrid pneumatic regenerative system by altering the density of the air entering the pneumatic device prior to the pneumatic device processing the air and delivering the air to the accumulator.

The hybrid pneumatic regenerative system of the present invention can be utilized with any types, makes and models of motorized vehicles including, without limitation, conventional automobiles (e.g., sedans, SUVs, pick-up trucks, etc.), as well as larger types of vehicles (e.g., heavy duty trucks, military, shipping and other types of industrial vehicles). The motorized vehicles include a main drive system (e.g., an internal combustion engine) to power, accelerate and propel the vehicle as well as a braking system to decelerate or stop the vehicle. The motorized vehicles are typically types having at least four wheels with at least one front axle and at least one rear axle. However, it is noted that the present invention is not limited to such types of vehicles, but instead can be implemented for use with any type of vehicle (e.g., a two wheeled vehicle, a three wheeled vehicle, a six wheeled vehicle, etc.) that includes a main drive system as well as a suitable braking system. It is noted that main drive systems (such as internal combustion engines, electric motors, etc.) and braking systems (e.g., disk braking systems, or any other suitable types of braking systems) are well known in the art of motorized vehicles, and the present invention can be implemented with any such conventional types and/or other types of systems.

Figure 2:
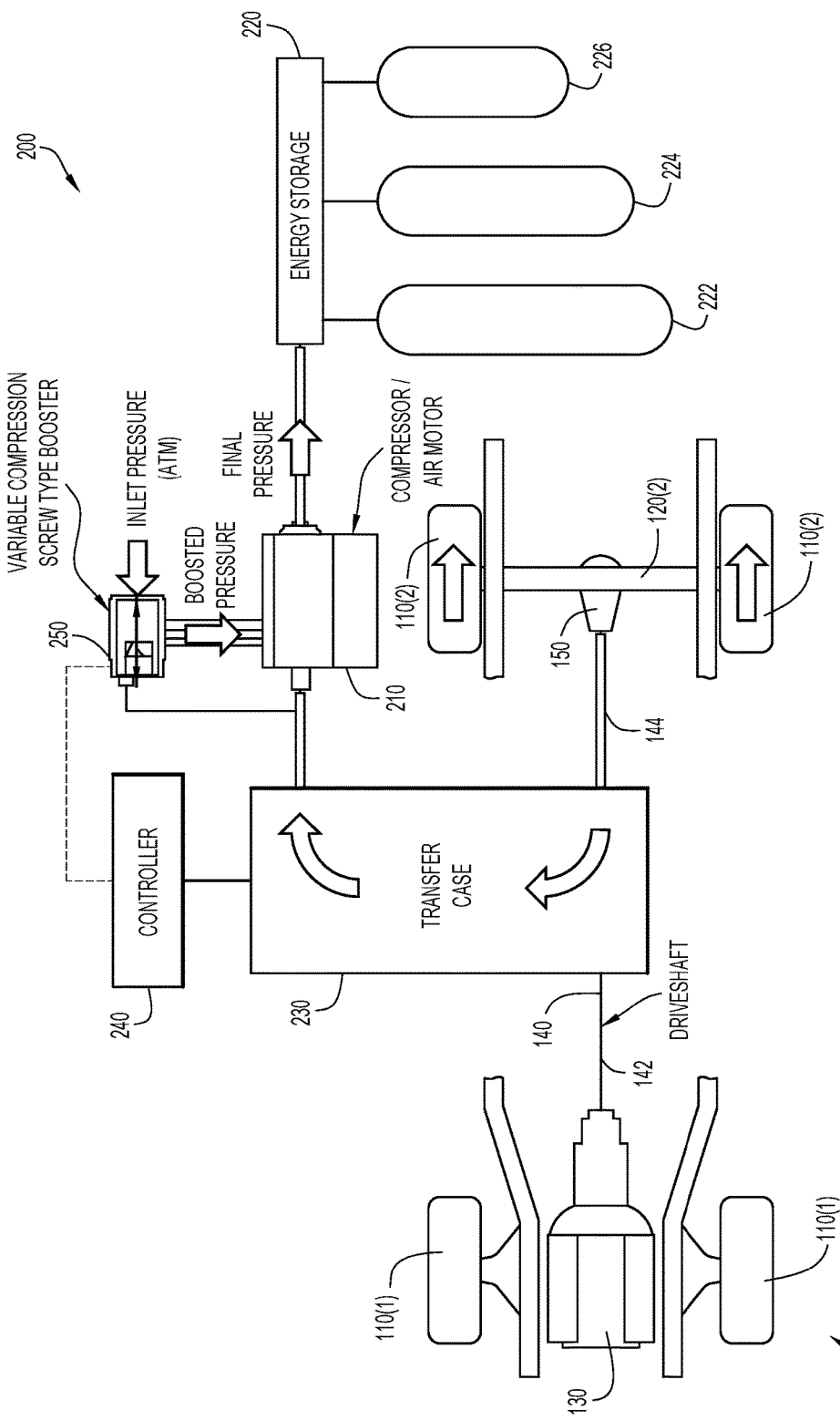
FIG. 2 illustrates a schematic representation of a first exemplary embodiment of a hybrid pneumatic regenerative system used to store energy during a braking event in accordance with the present invention.
Figure 3:
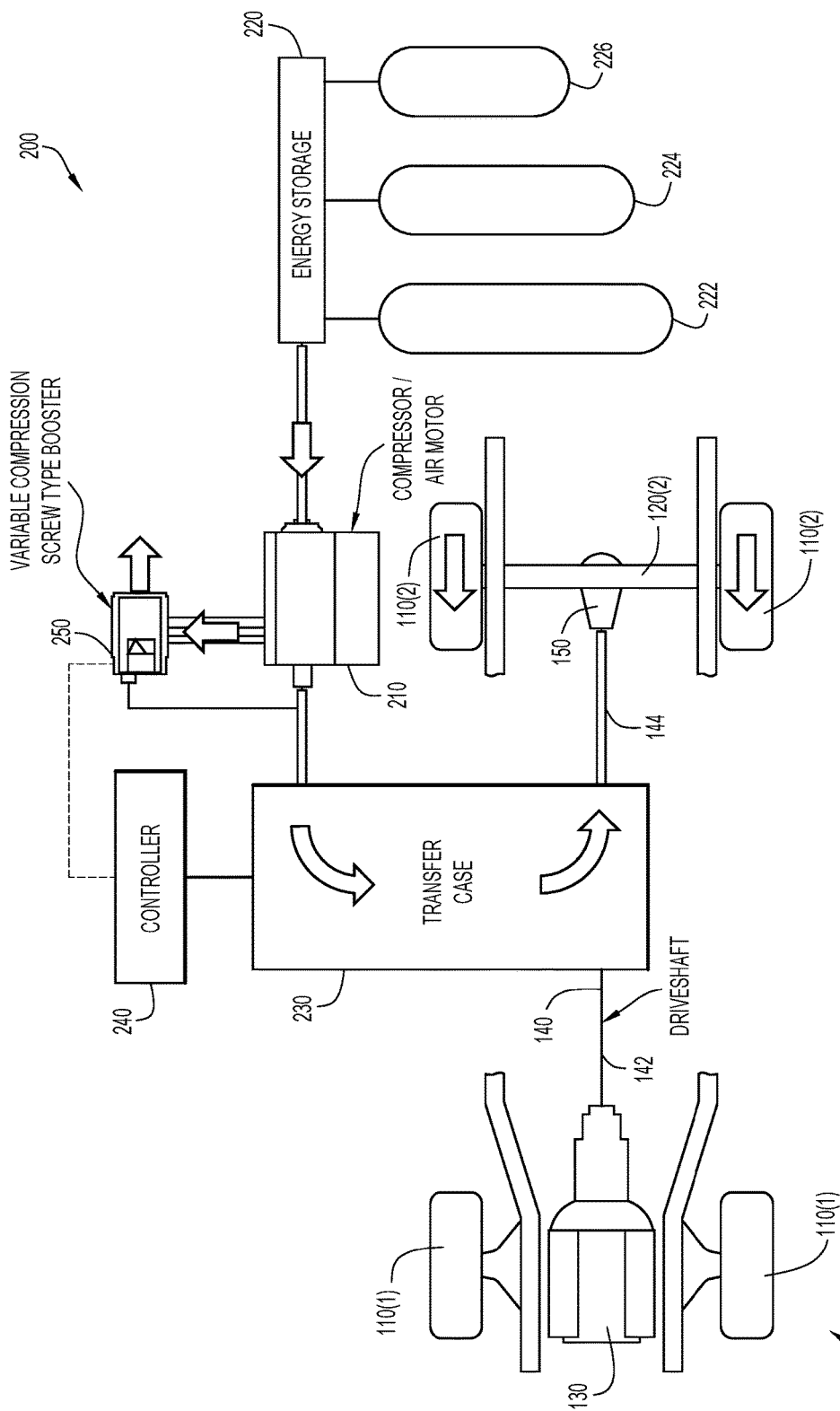
FIG. 3 illustrates a schematic representation of a first exemplary embodiment of a hybrid pneumatic regenerative system used to employ stored energy during an acceleration event in accordance with the present invention.
Figure 4:
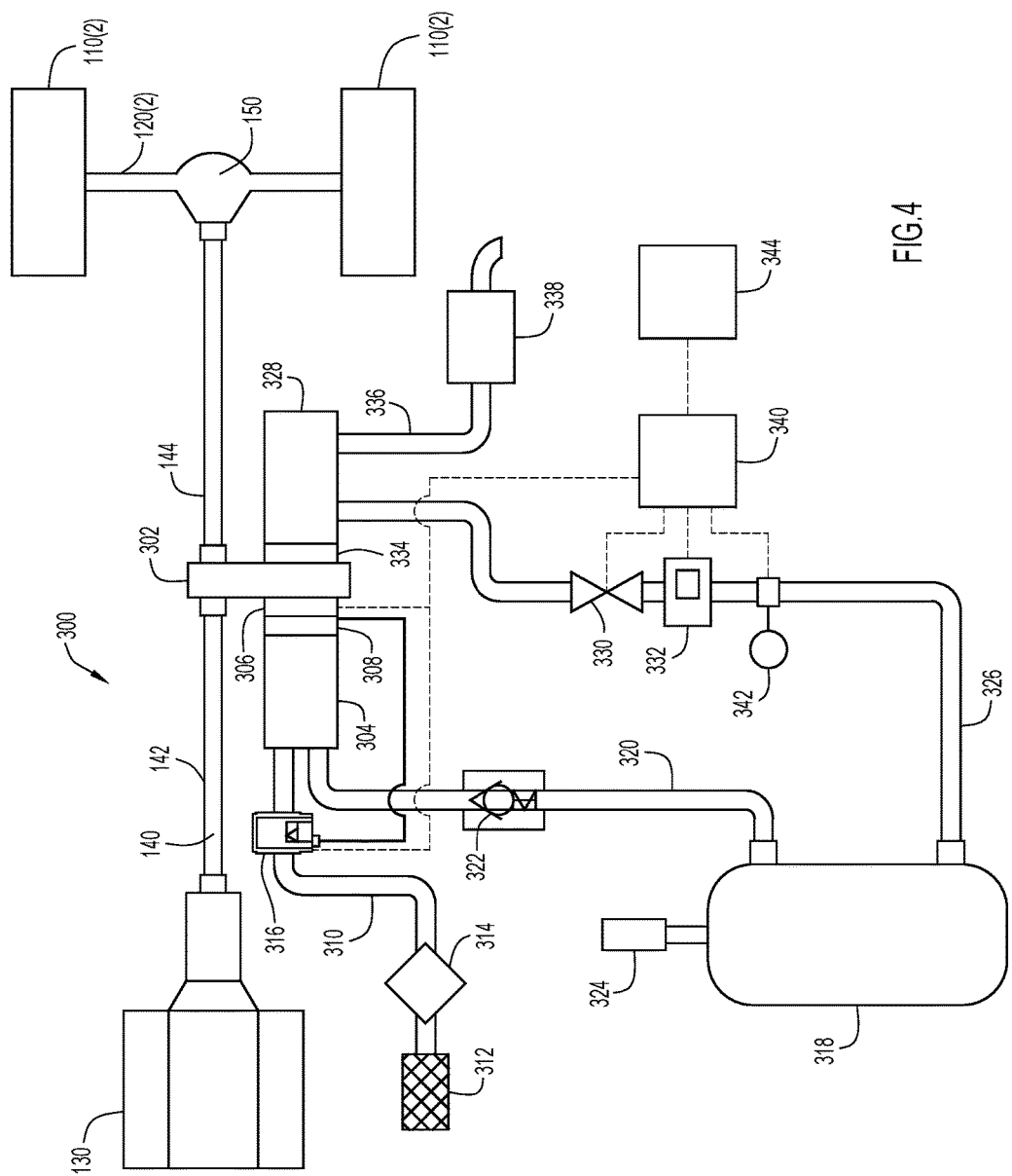
FIG. 4 illustrates a detailed schematic representation of a second exemplary embodiment of a hybrid pneumatic drive system for use with the motorized vehicle illustrated in FIG. 1 in accordance with the present invention.

Exemplary embodiments of a hybrid pneumatic regenerative system in accordance with the present invention are illustrated in FIGS. 1-4. FIG. 1 illustrates a motorized vehicle 100, and more specifically, a front-loading refuse truck, equipped with the hybrid pneumatic regenerative system 200. The motorized vehicle 100 includes a plurality of axles 120(1), 120(2), 120(3). Each of the axles 120(1)-120(3) includes a pair of wheels 110(1), 110(2), 110(3), respectively. The pairs of wheels 110(1)-110(3) are coupled to the ends of each of the plurality of axles 120(1)-120(3), where the each of the pairs of wheels 110(1)-110(3) are configured to support the motorized vehicle 100 on a support surface. As illustrated in FIGS. 2-4, the motorized vehicle 100 includes a drive mechanism 130 (e.g., an internal combustion engine) that is operatively coupled a drive shaft 140, which includes a first portion 142 and a second portion 144. The drive shaft 140 mechanically couples the drive mechanism 130 to at least one of the axles 120(2) via a gearing mechanism 150 (e.g., a differential). Thus, the drive mechanism 130 is configured to drive rotation of the at least one axle 120(2) via the drive shaft 140, which, in turn, rotates the pair of wheels 110(2) to propel the motorized vehicle 100 along a support surface.

FIG. 1 further illustrates a hybrid pneumatic regenerative system 200 mechanically coupled to the second axle 120(2) of the motorized vehicle 100. The hybrid pneumatic regenerative system 200 is configured to operate both during a braking event/operation and an acceleration event/operation of the motorized vehicle 100. During a braking event, the hybrid pneumatic regenerative system 200 performs two main functions, absorbing the braking energy of the axle 120(2) via the pneumatic device 210, and storing the absorbed braking energy into an energy storage assembly/accumulator 220. During an acceleration event, the hybrid pneumatic regenerative system 200 performs two main functions, releasing the previously absorbed braking energy from the energy storage assembly/accumulator 220, and applying the previously absorbed braking energy to the axle 120(2) via the pneumatic device 210 to drive rotation of the axle 120(2). FIG. 2 illustrates the components of a first embodiment of the hybrid pneumatic regenerative system 200 during a braking event of the motorized vehicle 100, while FIG. 3 illustrates the components of the first embodiment of the hybrid pneumatic regenerative system 200 during an acceleration event of the motorized vehicle 100.

As illustrated in both FIGS. 2 and 3, the hybrid pneumatic regenerative system 200 includes, a pneumatic device 210 and an accumulator 220, a transfer case 230, an electronic control unit (ECU) or controller 240, and a variable boosting device 250. The transfer case 230 is coupled to the drive shaft 140. More specifically, the transfer case 230 is disposed between the first portion 142 of the drive shaft 140 and the second portion 144 of the drive shaft 140. The first portion 142 of the drive shaft 140 is coupled to the second portion 144 of the drive shaft 140 within the transfer case 230, such that rotational energy of the first portion 142 of the drive shaft 140 is conveyed to the second portion 144 of the drive shaft 140 during operation of the drive mechanism 130. The transfer case 230 includes any suitable number of gears, rotary shafts, etc. that facilitate transfer of rotational and kinetic energy from one rotating shaft or drive member to another, particularly when the shafts/drive members are not aligned coaxially or even in parallel with one another. The transfer case 230 is operatively coupled to the gear mechanism 150 of the axle 120(2). Thus, the transfer case 230 is indirectly coupled to the pair of wheels 110(2) of the axle 120(2). Furthermore, the transfer case 230 may contain a continuously variable transmission (CVT).

As further illustrated in FIGS. 2 and 3, the transfer case 230 is also operatively coupled to the pneumatic device 210 and the variable boosting device 250. The pneumatic device 210 is a multi-staged pneumatic device that can operate as either a compressor or a pneumatic motor (e.g., a four stage pneumatic device) depending on whether or not the pneumatic device 210 is operating during a braking event or an acceleration event of the motorized vehicle 100. As illustrated in FIGS. 2 and 3, the pneumatic device 210 and the variable booster device 250 are in fluid communication. More specifically, air that enters the variable booster device 250 from the environment surrounding the motorized vehicle 100 is eventually delivered to the pneumatic device 210. Because the transfer case 230 is mechanically coupled to the axle 120(2) of the motorized vehicle 100, rotation of the pair of wheels 110(2), and thus the axle 120(2), impart motion onto the transfer case 230. Motion imparted onto the transfer case 230 by rotation of the axle 120(2) is transferred by the transfer case 230 to both the pneumatic device 210 and the variable booster device 250. In other words, motion imparted onto the transfer case 230 by rotation of the axle 120(2) causes the transfer case 230 to drive operation of the pneumatic device 210 and the variable booster device 250.

FIGS. 2 and 3 further illustrate that the accumulator, or energy storage apparatus, 220 is coupled to the pneumatic device 210, such that the accumulator 220 is in fluid communication with the pneumatic device 210. As further illustrated, the accumulator 220 includes three tanks 222, 224, 226. The first tank 222 is the largest of the tanks 222, 224, 226, the third tank 226 is the smallest of the tanks 222, 224, 226, and the second tank 224 is smaller than the first tank 222 but larger than the third tank 226. Thus, the first tank 222 is capable of storing a larger volume of air than the other tanks 224, 226. Moreover, the storage tanks 222, 224, 226 are capable of storing air up to 8,000 psig (about 55.16 MPa) or even greater. Other embodiments of the accumulator 220 may contain any number of air storage tanks.

Finally, controller 240 of the hybrid pneumatic regenerative device 200 is logically coupled to at least the transfer case 230 and the variable booster device 250. As further explained below, the controller 240 is configured to adjust/control the CVT transmission of the transfer case 230. Similarly, as will be further explained below, the controller 240 is configured to control the variable booster device 250 and to what amount the variable booster device 250 pressurizes the incoming air. While not illustrated, the controller 240 is also logically connected with the brake and accelerator actuators of the motorized vehicle 100, such that the controller 240 is capable of determining the braking force or torque requested by the operator for the motorized vehicle 100. The controller 240 may also configured to calculate the velocity of the motorized vehicle 100, the rotational speed of the axle 120(2), and the current volume/pressure of the air stored within any of the tanks 222, 224, 226 of the accumulator 220.

During a braking event of the motorized vehicle 100, as illustrated in FIG. 2, the controller 240 actuates the transfer case 230 to selectively engage with at least the second portion 144 of the drive shaft 140 to receive the power transmitted from the rotation of the axle 120(2). When the transfer case 230 receives the power from the rotating axle 120(2), motion is imparted onto the inner components of the transfer case 230, such as the CVT transmission. The transfer case 230 translates the received power to both the pneumatic device 210 and the variable booster device 250 to operate both the pneumatic device 210 and the variable booster device 250. During the braking event, the power translated from the transfer case 230 to the pneumatic device 210 causes the pneumatic device 210 to operate as a compressor and draw air from the environment surrounding the motorized vehicle 100 through variable booster device 250 and into the pneumatic device 210. The variable booster device 250 compresses the incoming air to a first pressure state before the air travels into the pneumatic device 210, where it is then further compressed to a second pressure state and stored at a high pressure in the accumulator 220. As used herein, the term "pressurized air" refers to air that is at a pressure which is greater than the pressure of air in the ambient or surrounding environment for the motorized vehicle 100. As will be further detailed below, the variable booster device 250 can be altered to pressurize the air to a desired higher pressure at the first pressure state prior to the air being further compressed by the pneumatic device 210. The controller 240 is logically connected to the transfer case 230 and is configured to manage and regulate the CVT of the transfer case 230 to keep both the pneumatic device 210 and the variable booster device 250 operating at an optimal speed.

Based on the magnitude of the braking force requested, the amount of and pressure of the air disposed within the accumulator 220, and the motorized vehicle speed (including the rotational speed of the axle 120(2), the controller 240 calculates the total braking capacity of the hybrid pneumatic drive system 200, activates the hybrid pneumatic drive system 200, and diverts any excess braking energy (not capable of being absorbed by the pneumatic device 210) to a conventional brake system of the motorized vehicle 100. Upon activation of the hybrid pneumatic regenerative system 200, the controller 240 further regulates the CVT of the transfer case 230 based on the rotational speed of the axle 120(2) and the calculated braking force to cause the pneumatic device 210 to absorb the kinetic energy of the motorized vehicle 100. In other words, the pneumatic device 210 draws air from the environment surrounding the motorized vehicle 100 in through the variable booster device 250 and compresses the air. As previously explained, the controller 240 regulates the CVT of the transfer case 230 to maintain both the pneumatic device 210 and the variable booster device 250 at as close to optimal speed as possible to dispose the compressed air into the accumulator 220 until the maximum pressure of each of the air tanks 222, 224, 226 of the accumulator 220 is reached. The controller 240 also regulates the variable booster device 250 to control the degree and amount of air which the variable booster device 250 pre-pressurizes prior to the air entering the pneumatic device 210.

As pressure is built up within the accumulator 220, and the air disposed within the air tanks 222, 224, 226 of the accumulator builds, the force required to actuate pneumatic device 210 increases, which, in turn, imparts a drag on the rotational speed of the axle 120(2) and the wheels 110(2) via the transfer case 230. Furthermore, the controller 240 can further serve to slow the rotational speed of the axle 120(2) and the wheels 110(2) by regulating and altering the CVT based on the operational loads of the pneumatic device 210 and the calculated braking force magnitude of the motorized vehicle 100. The controller 240, in performing this function, may also take into consideration the current pressure of the tanks 222, 224, 226 of the accumulator 220 relative to the maximum pressure of the tanks 222, 224, 226 of the accumulator 220, as well as the current speed or velocity of the motorized vehicle 100. When this drag is imparted onto the axle 120(2), the speed or velocity of the motorized vehicle 100 is reduced. In the event that the tanks 222, 224, 226 of the accumulator 220 reach their maximum pressure before the motorized vehicle 100 decelerates to the desired or intended speed, the remaining or excess braking force that is required to complete the braking operation is provided by the conventional brake system (e.g., a disk brake system) for the motorized vehicle 100.

During an acceleration event of the motorized vehicle 100, as illustrated in FIG. 3, the hybrid pneumatic regenerative mechanism 200 utilizes the stored pressurized air disposed within the tanks 222, 224, 226 of the accumulator 220 to operate, or put to work, the pneumatic device 210 to drive rotation of the axle 120(2) via the transfer case 230. Thus, during an acceleration event of the motorized vehicle 100, the pneumatic device 210 operates as an air motor, where the pneumatic device 210 draws in and expands the pressurized air from the accumulator 220 to impart rotation onto the axle 120(2) via the transfer case 230.

When the operator of the motorized vehicle 100 commands an acceleration of the motorized vehicle 100, a signal is sent to the controller 240 that is translated to a torque command. Based on the available energy (pressure, volume, temperature) stored within the accumulator 220, the pneumatic device 210 is activated via the opening of the tanks 222, 224, 226 of the accumulator 220. The pressurized air is transferred from the accumulator 220 to the pneumatic device 210 prior to the start of each cycle of the pneumatic device 210. The pneumatic device 210 expands the pressurized air and delivers power to rotate the axle 120(2) via the transfer case 230. The pressurized air may be discharged by the pneumatic device 210 to the environment surrounding the motorized vehicle 100. In some embodiments, the pneumatic device 210 may discharge the air to the environment without the air traveling back through the variable booster device 250. In other embodiments, however, the pneumatic device 210 may discharge the air to the environment, where the air travels back through the variable booster device 250 prior to being discharged to the environment. The controller 240 regulates and alters the CVT of the transfer case 230 to enable the power output by the pneumatic device 210 to rotate the axle 120(2) with the optimal rotational speed. In the event that the torque requested by the operator of the motorized vehicle 100 is above that which the hybrid pneumatic regenerative system 200 can supply, the drive mechanism 130 may be configured to supply the torque deficit to the axle 120(2). In some embodiments, the device mechanism 130 and the pneumatic device 210 may be configured to supply power in parallel, or simultaneously, to rotate the axle 120(3).

Referring to FIG. 4, illustrated is a detailed schematic diagram of a second exemplary embodiment of a hybrid pneumatic regenerative system 300 in accordance with the present invention. The hybrid pneumatic regenerative system 300 may be equipped on the motorized vehicle 100 illustrated in FIG. 1, where the hybrid pneumatic regenerative system 300 is mechanically coupled to the second axle 120(2) on the motorized vehicle 100 and the pair of wheels 110(2). This second embodiment of the hybrid pneumatic regenerative system 300 is shown connected to the drive shaft 140, between the first portion 142 of the drive shaft 140 and the second portion 144 of the drive shaft 140, via the transfer case 302. As illustrated, the drive mechanism 130 is connected via the first portion 142 of the drive shaft 140 and transfer case 302 to the second portion 144 of the drive shaft 140. The drive mechanism 130 can be an internal combustion engine of any conventional or other suitable type that utilizes a fossil fuel source (e.g., gasoline, diesel fuel, propane, etc.) to power the drive mechanism 130, where the drive mechanism 130 works in any conventional or other suitable manner to rotate the drive shaft 140. Alternatively, the drive mechanism 130 can be of any other suitable type (e.g., an electric powered motor) that provides drive power to the drive shaft 140. The first portion 142 of the drive shaft 140 from the drive mechanism 130 is coupled to the second portion 144 of the drive shaft 140 within the transfer case 302, such that rotational energy of the first portion 142 of the drive shaft 140 is conveyed to the second portion 144 of the drive shaft 140 during operation of the drive mechanism 130. The transfer case 302 includes any suitable number of gears, rotary shafts, etc. that facilitate transfer of rotational and kinetic energy from one rotating shaft or drive member to another, particularly when the shafts/drive members are not aligned coaxially or even in parallel with one another.

As illustrated in FIG. 4, the second portion 144 of the drive shaft 140 couples the transfer case 302 of the pneumatic regenerative system 300 to the axle 120(2) via the gearing mechanism 150 (e.g., differential). Thus, the pneumatic regenerative system 300 is ultimately coupled to the pair of wheels 110(2) of the motorized vehicle 100. Rotation of the drive shaft 140 provides power and rotational energy to the axle 120(2) and the wheels 110(2) to propel the motorized vehicle 100. As previously noted, the motorized vehicle 100 can be of any suitable make, model or type, where the motorized vehicle 100 can be propelled utilizing any suitable number of wheels and/or any suitable number of power drive mechanisms that transfer drive power from the drive shaft 140 to one or more wheels or pairs of wheels. Thus, while the drive shaft 140 shown in FIG. 4 is shown as providing power to one pair of wheels 110(2) (e.g., one set of rear wheels of the motorized vehicle 100), it is noted that power can provided to any of the wheels 110(1), 110(2), 110(3) of the motorized vehicle 100 (e.g., front wheel drive, rear wheel drive, all wheel drive, etc.) For ease of reference, only the drive system and a pair of drive wheels 110(2) are schematically shown for the motorized vehicle 100 of FIG. 1. However, it should be understood that the system is connected to a lower carriage portion or chassis of the motorized vehicle 100. It is further noted that the drive system can be connected to the vehicle chassis in a similar manner as a conventional or other type of drive system for a motorized vehicle 100 (e.g., via suitable mounts for components to the chassis). As previously noted, the motorized vehicle 100 may include a conventional or main braking system (e.g., disk brakes) that is implemented on any selected number of wheels (e.g., one, two or more) of the motorized vehicle 100 to decelerate or stop the motorized vehicle 100. The main braking system is not shown in FIG. 1 or 4 for ease of reference.

The hybrid pneumatic regenerative system 300 of the present invention includes an air compressor 304 that is coupled with the drive shaft 140 via the transfer case 302, an electromechanical clutch 306, and a continuously variable transmission (CVT) 308. In particular, the clutch 306, via an electrical actuating mechanism (e.g., a solenoid), is provided to selectively engage and disengage a drive shaft of the compressor 304 connected with the CVT 308 and with the second portion 144 of the drive shaft 140 within the transfer case 302. When engaged with the second portion 144 of the drive shaft 140, the CVT 308 converts the power of the second portion 144 of the drive shaft 140 to an appropriate drive power for the air compressor 304 (e.g., via suitable gearing mechanisms within the CVT 308). This facilitates operation of the compressor 304 to draw air in from the external environment surrounding the motorized vehicle 100 and compress/pressurize the air to a selected pressure. Air is drawn into the compressor 304 via an air intake conduit 310. An intake screen 312 is disposed at the inlet end of the air intake conduit 310, and an air filter 314 is disposed within the conduit 310 at a location downstream from the intake screen 312. Also coupled to the conduit 310, at a location downstream from the air compressor 304, is a variable booster device 316. As explained in further detail below, the variable booster device 316 is configured to compresses the incoming air to a first pressurized state before the air travels into the air compressor 304, where the amount the air is pressurized by the variable booster device 316 can be varied. The variable booster device 316 is also mechanically coupled to the CVT 308 so that the CVT 308 converts the power of the second portion 144 of the drive shaft 140 to an appropriate drive power for the variable booster device 316 (e.g., via suitable gearing mechanisms within the CVT 308). Both the intake screen 312 and air filter 314 provide a suitable filtration of the intake air (e.g., removing particulate matter of selected dimensions from the air) prior to the intake air entering the variable booster device 316 and the compressor 304.

The hybrid pneumatic regenerative system 300 further includes an accumulator 318 comprising a high pressure tank that receives pressurized air from the compressor 304, via a pressurized air conduit 320. A check valve 322 is provided within the air conduit 320 to prevent any backflow of air from the air conduit 320 back to the compressor 304. In addition, a pressure regulator can be provided within the air conduit 320 to control the pressure and flow of air prior to entry within the accumulator 318. The accumulator 318 may also include a relief valve 324 that controls the pressure within the accumulator 318 (e.g., by releasing pressurized air from the accumulator 318 to the external environment when the pressure within the accumulator 318 exceeds an upper limit value).

Although the accumulator 318 is depicted in FIG. 4 as a single tank, it is noted that the accumulator 318 can alternatively comprise a plurality of tanks arranged in parallel or in series within the pneumatic regenerative system 300, as depicted for the embodiment illustrated in FIGS. 2 and 3. The accumulator 318 is designed to accommodate and store the pressurized air received from the air compressor 304. As previously explained, the term "pressurized air" refers to air that is at a pressure which is greater than the pressure of air in the ambient or surrounding environment for the motorized vehicle 100. In particular, the accumulator 318 can store pressurized air at pressures of at least about 500 psig (about 3.447 MPa) or greater for use in operation of the pneumatic regenerative system 300. For example, during system operation, the compressor 304 can provide pressurized air to the accumulator 318, with the accumulator 318 storing pressurized air at pressures as large as about 6,000 psig (about 41.37 MPa) to about 8,000 psig (about 55.16 MPa) or even greater.

Another pressurized air conduit 326 connects an outlet of the accumulator 318 with an inlet of a pneumatic motor 328. Disposed within the air conduit 326 is an electromechanical valve 330 that is electrically controlled (e.g., via a solenoid actuator) to control the flow of pressurized air from the accumulator 318 to the pneumatic motor 328. A pressure regulator 332 is also provided within the air conduit 326 to control the pressure and flow of pressurized air to the pneumatic motor 328.

The pneumatic motor 328 receives the pressurized air from the accumulator 318 and allows the air to expand to generate mechanical energy, which rotates an output shaft of the motor 328. The output shaft of the pneumatic motor 328 is coupled, via a one-way or sprag clutch 334, to a suitable connection within the transfer case 302 that is also coupled with the second portion 144 of the drive shaft 140. The sprag clutch 334 frictionally engages with the connection within the transfer case 302 when the output shaft of the motor 328 rotates in one direction, and the sprag clutch 334 disengages or free wheels with the connection in the transfer case 302 when the output shaft of the motor 328 is stationary. Thus, the pneumatic motor 328 delivers rotary drive power to the second portion 144 of the drive shaft 140 by expansion of pressurized air received from the accumulator 318. The expanded air exits the motor 328 via an exhaust conduit 336 and muffler 338.

An ECU or controller 340 is provided to control operation of the pneumatic regenerative system 300 by controlling the electromechanical clutch 306 (which couples the compressor 304 to the second portion 144 of the drive shaft 140, via the transfer case 302) and the electromechanical valve 330 (which provides pressurized air flow from the accumulator 318 to the inlet of the pneumatic motor 328). The controller 340 is coupled with the clutch 306 and the valve 330, as well as one or more sensors provided within the accumulator 318 and/or at other locations within the pneumatic regenerative system 300. In particular, one or more pressure sensors as well as any other types of sensors (e.g., temperature sensors) are provided to measure the pressure and/or amount of pressurized air that is stored within the accumulator 318 and/or flowing through the air conduit 326 at any given time. As shown in FIG. 4, a pressure sensor 342 is provided in the air conduit 326 proximate the outlet of the accumulator 318. However, the pneumatic regenerative system 300 according to the present invention can include any other pressure and/or other types of sensors at other locations (e.g., to measure pressure and/or temperature within the accumulator 318). The controller 340 is also coupled with the pressure regulator 332 so as to control operation of the regulator 332 in order to further control the pressure and flow of air to the pneumatic motor 338. In addition, the controller 340 is coupled with the variable booster device 316 so as to control the degree or amount in which the variable booster device 316 pressurizes the air prior to the air entering the compressor 304.

The controller 340 is coupled with the sensor(s) (represented by sensor 342), regulator 332, clutch 306, valve 330, and variable booster device 316 via any suitable wireless or hardwire connection. In addition, the controller 340 is coupled (via a wireless or hardwire connection) with the accelerator and brake actuators of the motorized vehicle 100 (represented generally as box 344 in FIG. 1). One or more suitable position and/or any other types of displacement sensors are connected with the accelerator and brake actuators and coupled with the controller 340 to provide the controller 340 with an indication of the amount of braking force or the acceleration force required during operation (e.g., the braking or acceleration force can be determined as proportionate to the amount or degree of displacement of the brake or acceleration actuator that is pressed by the operator of the motorized vehicle 100).

The controller 340 includes a processor with suitable logic that facilitates control of the hybrid pneumatic regenerative system 300 based upon the braking and power requirements of the motorized vehicle 100 during operation. The controller 340 can also include a memory module to store data acquired from the sensors and/or any other types of information, including control algorithms to be implemented by the processor during operation of the motorized vehicle 100.

As previously explained, the detailed schematic diagram of the second exemplary embodiment of the hybrid pneumatic regenerative system 300 illustrated in FIG. 4 may be implemented on the motorized vehicle 100 illustrated in FIG. 1. At the start of operation of the motorized vehicle 100, the accumulator 318 of system 300 may be empty or filled to some level (e.g., partially filled or filled to capacity) with pressurized air (e.g., the accumulator 318 may contain some amount of pressurized air that was accumulated during a previous use of the motorized vehicle 100). Operation of the pneumatic regenerative system 300 is initiated when an operator starts an ignition for the motorized vehicle 100 to initiate operation of the drive mechanism 130. The motorized vehicle 100 proceeds to travel at a selected velocity.

When the operator decides to initiate a braking event of the motorized vehicle 100, the controller 340 of the system 300 determines whether to "charge" the accumulator 318 with pressurized air. A braking command is initiated by the operator of the motorized vehicle 100 by actuating the brake actuator of the motorized vehicle 100 (shown generally as box 344 in FIG. 4). The controller 340, which is in communication with the brake actuator sensors, receives the braking command and determines the magnitude of the brake force required (e.g., based upon the amount or degree of displacement of the brake actuator by the operator).

The controller 340 next determines the brake force capacity that can be provided the system 300. In particular, when the compressor 304 and the variable booster device 316 are activated, by coupling the electromechanical clutch 306 with the second portion 144 of the drive shaft 140 via the transfer case 302, at least some of the rotational power of the second portion 144 of the drive shaft 140 is transferred as kinetic energy, through the connected transfer case 302, clutch 306, and CVT 308, to operate the compressor 304 and the variable booster device 316. The transfer of kinetic energy by the transfer case 302, clutch 306, and CVT 308 of the system 300 results in a "drag" on the second portion 144 of the drive shaft 140, which, in turn, imparts that "drag" onto the axle 120(2). This "drag" imparted onto the axle 120(2) of the motorized vehicle 100 reduces the speed or velocity of the motorized vehicle 100. The controller 340 determines, based upon the amount of pressurized air that is already in the accumulator 318 (e.g., by measuring the pressure and/or any other conditions within the accumulator 318 and/or the conduit 326 via the sensors 342 disposed at such locations) and thus to what extent the compressor 304 and the variable booster device 316 need to operate, the magnitude of the brake force capacity (e.g., the amount of "drag" that can be applied to the second portion 144 of the drive shaft 144) that results from operation of the compressor 304 and the variable booster device 316. The remaining or excess braking force that is required to achieve the required braking force is provided by the main braking system (e.g., a disk brake system) for the motorized vehicle 100. Control of the amount of force applied by the main braking system can be achieved in any number of conventional or other ways (e.g., for a hydraulic braking system, by controlling the pressure of the hydraulic portion that applies a force to the mechanical/frictional portion of the braking system).

In an exemplary embodiment, the control logic of the controller 340 may allow operation of the compressor 304 only to the extent that a maximum pressure ($P_{max}$) is achieved within the accumulator 318. Operation of the compressor 304 and the variable booster are initiated and maintained during a braking cycle of operation of the motorized vehicle 100 (i.e., based upon a brake command by the operator depressing the brake actuator of the vehicle 100) only to the extent that the measured pressure within the accumulator 318 is no greater than the maximum pressure ($P_{meas} \leq P_{max}$). In another exemplary embodiment, the controller 340 may continuously operate the compressor 304 and the variable booster device 316 to supply pressurized air to the accumulator 318 during the braking operation. However, the pressure within the accumulator 318 can be controlled so as to not exceed the maximum pressure ($P_{max}$) by bleeding air from the accumulator 318 (e.g., via the relieve valve 324) or from each air conduit 326 (e.g., via an electromechanical valve 330 disposed along the air conduit 326 that can be selectively controlled by the controller 340 to bleed air from the system 300 when the pressure approaches $P_{max}$).

After determining the brake force capacity of the pneumatic regenerative system 300, the controller 340 initiates a braking operation for the axle 120(2) of the motorized vehicle 100 by activating the air compressor 304 and variable booster device 316. In particular, the controller 340 activates the clutch 306 so as to couple the drive shaft of the compressor 304 and the variable booster device 316, via the CVT 308, clutch 306 and transfer case 302, with the second portion 144 of the drive shaft 140. The main braking system is also actuated, as necessary (e.g., when it is determined that the required braking force exceeds the braking capacity of pneumatic regenerative system 300). The kinetic energy from the rotation of the axle 120(2) and the second portion 144 of the drive shaft 140 is transferred from the transfer case 302 and via the clutch 306 and CVT 308 to the drive shafts of the compressor 304 and the variable booster device 316. This results in pressurized air being supplied to the accumulator 318 and also a deceleration or reduction in velocity of the axle 120(2) of the motorized vehicle 100.

The controller 340 determines whether a sufficient brake force has been applied to the axle 120(2) of the motorized vehicle 100 as a result of actuation of the compressor 304 and the variable booster device 316 and/or the main braking system of the vehicle 100. The axle 120(2) may be separately evaluated to determine if the sufficient brake force has been applied. If the required brake force has been fully applied for the axle 120(2), the compressor 304 and the variable booster device 316 (if still operating) are deactivated along with the main braking system, as necessary, and the braking operation ends. The air compressor 304 and the variable booster device 316 are deactivated by decoupling the associated clutch 306 with the second portion 144 of the drive shaft 140.

If the required braking force has not yet been fully applied, however, the controller 340 monitors the pressure within the accumulator 318. If the pressure within the accumulator 318 is less than the maximum allowed pressure ($P_{meas} < P_{max}$), the controller 340 re-activates or maintains activation of the compressor 304 and the variable booster device 316. If the measured pressure within the accumulator 318 is not less than the maximum allowed pressure, the air compressor 304 and the variable booster device 316 are deactivated. In an alternative embodiment, as noted above, the air compressor 304 can continue to operate during the entire braking operation, where the controller 340 monitors the pressure within the accumulator 318 and bleeds the accumulator 318 as necessary (e.g., when $P_{meas}$ approaches $P_{max}$). In yet another embodiment, the controller 340 may deactivate the variable booster device 316 prior to deactivating the compressor 304, where the controller 340 may deactivate the variable booster device 316 based on the brake force already applied to the axle 120(2), the total brake force requested, and the pressure within accumulator 318.

Thus, during the braking event, the motorized vehicle 100 is equipped with the hybrid pneumatic regenerative system 300, the energy that would otherwise be lost from decelerating axle 120(2) of the motorized vehicle 100 is recaptured to some extent by the system 300, which pressurizes air and stores the pressurized air within the accumulator 318 for later use during an acceleration event of the motorized vehicle 100.

When the operator of the motorized vehicle 100 initiates an acceleration command by actuating the accelerator actuator (indicated generally as box 344 in FIG. 4), the displacement sensor(s) associated with the accelerator actuator provides the command to the controller 340 of the system 300, where the degree of acceleration to be applied by the system 300 is determined by the controller 340 based upon the sensor measurements. The controller 340 determines the magnitude of the acceleration force required for the axle 120(2) based upon the displacement sensor information. The controller 340 also determines the capacity of the acceleration force that can be provided by the system 300 based upon the known amount of pressurized air within the accumulator 318 (e.g., based upon pressure measurements and any other types of sensor measurements, such as temperature measurements, measured within the accumulator 318 and/or within the air conduit 326). The controller 340 activates at least one of the pneumatic motor 328 and the drive mechanism 130 based upon the acceleration force requirements. For example, if it is determined that the pneumatic motor 328 of the system 300 can contribute to the acceleration requirements based upon the amount of pressurized air within the accumulator 318, then the pneumatic motor 328 is activated to drive rotation of the axle 120(2), even in conjunction with the drive mechanism 130 (as explained below in detail). However, if it is determined that there is an insufficient amount of pressurized air necessary to operate the pneumatic motor 328 to meet at least a portion of the acceleration requirements, only the drive mechanism 130 is activated to meet the acceleration requirements.

The controller 340 activates the pneumatic motor 328 by opening the electromechanical valve 330 to force pressurized air from the accumulator 318 through the air conduit 326 and to the inlet of the pneumatic motor 328. The pressure of the air is also regulated by the regulator 332, which is selectively controlled by the controller 340. The pressurized air flows through the air conduit 326 to the inlet of the pneumatic motor 328, where it expands within the motor 328 and causes the drive shaft of the motor 328 to rotate. The one way or sprag clutch 334 connected with the rotating drive shaft of the pneumatic motor 328 couples, via the transfer case 302, with the second portion 144 of the drive shaft 140, delivering accelerating power to the axle 120(2). The expanded air exits the pneumatic motor 328 through the exhaust conduit 336 and muffler 338, where it is vented to the environment surrounding the motorized vehicle 100.

When the pneumatic motor 328 and the drive mechanism 130 are both activated, they can operate in parallel to provide power to the drive shaft 140 of the vehicle 100. In other words, both the pneumatic motor 328 and drive mechanism 130 can operate together, where the pneumatic motor 328 ceases operation when the pressurized air supply from the accumulator 318 is sufficiently depleted. Alternatively, the system 300 can be designed to operate in series, where the pneumatic motor 328 can be activated first and operated until its energy is depleted or exhausted (i.e., the pressurized air is sufficiently depleted within the accumulator 318), followed by activation of the drive mechanism 130.

The controller 340 deactivates the pneumatic motor 328 (by closing the associated electromechanical valve 330) when it is determined that the pressurized air supply is sufficiently depleted (e.g., when a measured pressure within the accumulator 318, $P_{meas}$, is below a minimum or threshold value) and/or when the required acceleration force has been applied to the axle 120(2).

Thus, the system 300 facilitates "charging" of the accumulator 318 with pressurized air during a braking event of the motorized vehicle 100, so as to capture some of the braking energy from the axle 120(2), with subsequent use of the captured energy during an acceleration event of the motorized vehicle 100. A continuous cycle of braking and acceleration events when utilizing the motorized vehicle 100 results in a reduction of the energy requirements for the drive mechanism 130 of the motorized vehicle 100.

Figure 5:
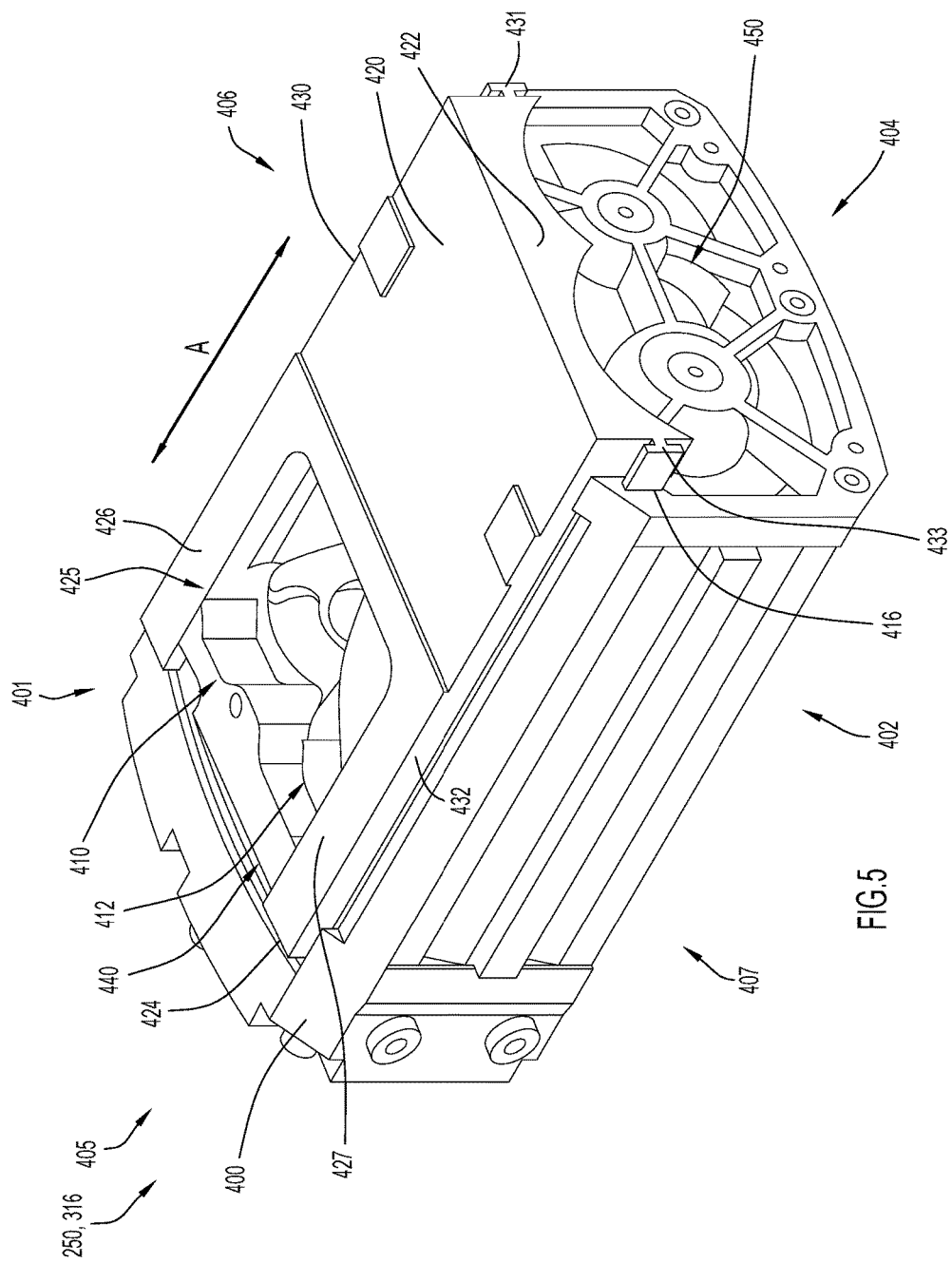
FIG. 5 illustrates a perspective view of a variable booster device utilized in the hybrid pneumatic regenerative system of FIGS. 2 and 4 during a braking operation of a motorized vehicle.

Turning to FIG. 5, illustrated is an example embodiment of the variable booster device 250, 316 that may be utilized in the first exemplary embodiment of the pneumatic regenerative system 200 and the second exemplary embodiment of the pneumatic regenerative system 300 in accordance with the present invention. The variable booster device 250, 316 includes a main body or housing 400 and a sliding plate 420. The main body 400 of the variable booster device 250, 316 is substantially rectangular with a top side 401 and an opposite bottom side 402. The main body 400 further includes a front end 404, and opposite rear end 405, a first side 406, and a second side 407 opposite the first side 406. The top side 401 of the main body 400 includes an opening 410, which provides access to the interior cavity 412 of the main body 400. The top side 401 further includes two grooves 414, 416. The first groove 414 (not labeled) is disposed on the top side 401 proximate to the first side 406. The second groove 416 is disposed on the top side 401 proximate to the second side 407. Both the first groove 414 and the second groove 416 extend through the top side 401 from the front end 404 to a point proximate the rear end 405.

Slidably disposed on the top side 401, and configured to at least partially cover the opening 410, is a plate 420. The plate 420 includes a front end 422 and an opposite rear end 424. The plate 420 further includes first and second sides 430, 432, which span between the front end 422 and the rear end 424. As further illustrated in FIG. 5, an aperture 425 is disposed in the rear end 424 and through the plate 420. The aperture 425 is disposed in the plate 420 such that the aperture 425 is equidistant from the first side 430 and the second side 432, such that the plate 420 includes a first extension 426 and a second extension 427 that extend along the sides of the aperture 425 proximate to the rear end 424 of the plate 420. Because the plate 420 covers the top side 401 of the main body 400, the opening 410 on the top side 401 of the main body 400 and the aperture 425 of the plate 420 collectively define the outlet 440 of the variable booster device 250, 316.

Disposed on the first and second sides 430, 432 of the plate 420 are t-shaped flanges/rails 431, 433, respectively. The first rail 431 is configured to be slidably received by the first groove 414 of the top side 401 of the main body 400, while the second rail 433 is configured to be slidably received by the second groove 416 of the top side 401 of the main body 400. Thus, the plate 420 is configured to slide along the top side 401 of the main body 400 along longitudinal plane A, where the rails 431, 433 slide within the grooves 414, 416, respectively. As further detailed below, sliding the plate 420 along the longitudinal plane A moves the plate 420 with respect to the main body 400 of the variable booster device 250, 316, such that the exposed portion of the opening 410 of the top side 401 of the main body 400 varies. In other words, and as further detailed below, sliding the plate 420 along the longitudinal plane A alters the size of the outlet 440 of the variable booster device 250, 316.

FIG. 5 further illustrates an inlet port 450 disposed on the front end 404 of the main body 400 of the variable booster device 250, 316. The inlet port 450 is in fluid communication with the interior cavity 412 and the outlet 440 of the variable booster device 250, 316, such that gas (e.g., air) is configured to travel through the inlet port 450 and into the interior cavity 412 of the main body 400

Figure 6:
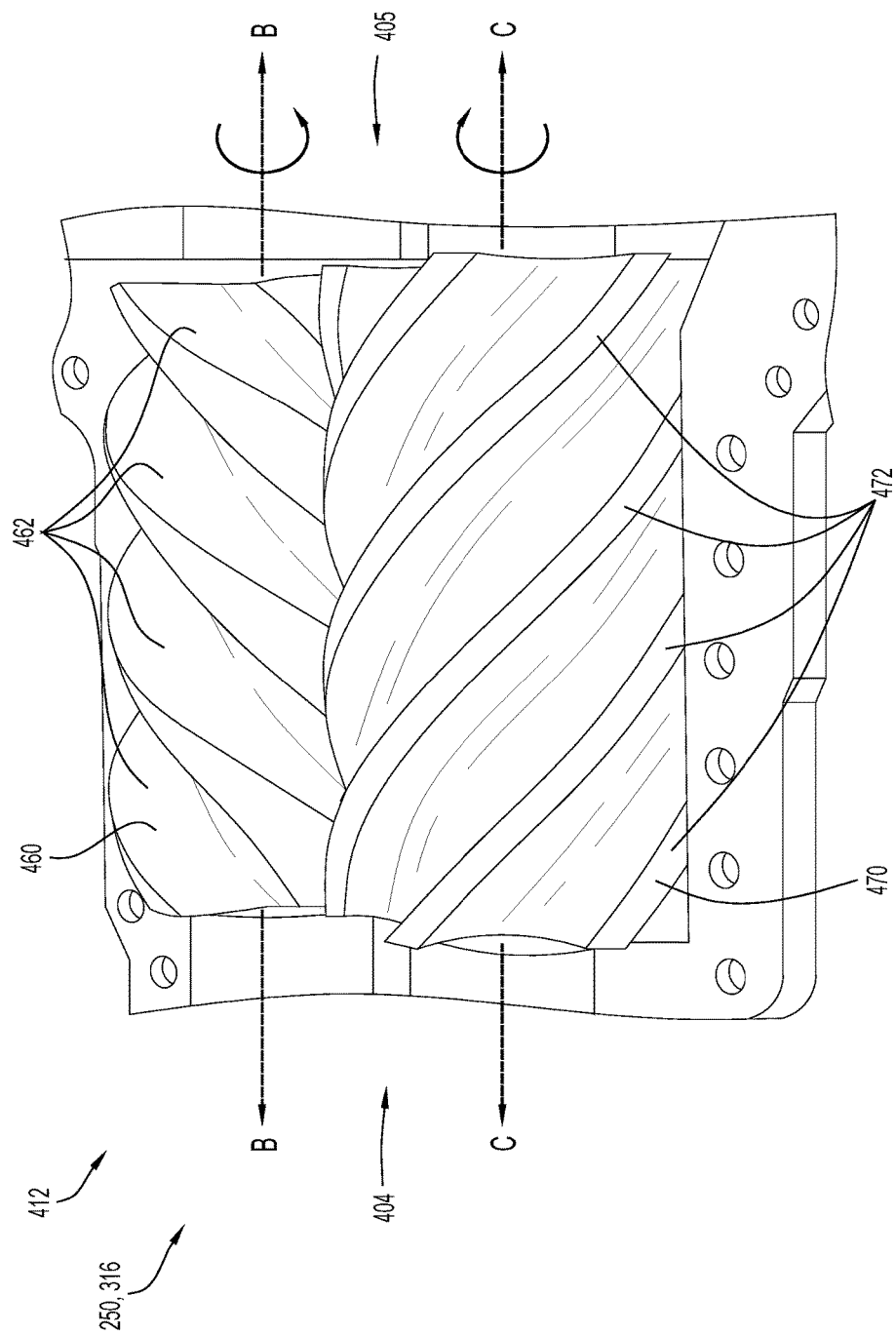
FIG. 6 illustrates an interior view of the variable booster device illustrated in FIG. 5.

As best illustrated in FIG. 6, the variable booster device 250, 316 is a rotary-screw compressor. Rotary-screw compressors are a type of gas compressor that utilizes two meshing helical screw rotors 460, 470 to compress the gas (e.g., air). The first screw rotor 460 and the second screw rotor 470 are disposed within the interior cavity 412 of the main body 400 of the variable booster device 250, 316. The air enters the variable booster device 250, 316 at the inlet port 450 on the front end 404 of the main body 400 of the variable booster device 250, 316, and moves through the variable booster device 250, 316 along the threads 462, 472 as the screws 460, 470 rotate. The first screw rotor 460 includes a plurality of threads 462. The first screw rotor 460 is configured to rotate about axis B in a first direction. The second screw rotor 470 includes a plurality of threads 472. The second screw rotor 470 is configured to rotate about axis C in a second direction, where the second direction is opposite of the first direction. For example, the first screw rotor 460 may rotate about axis B in a counterclockwise direction, while the second screw rotor 470 may rotate about axis C in a clockwise direction. As illustrated, the threads 462 of the first screw rotor 460 are intermeshed with the threads 472 of the second screw rotor 470. The meshing threads 462, 472 of the screw rotors 460, 470 force the gas (e.g., air) through the main body 400 while simultaneously compressing the gas (e.g., air) between the threads 462, 472 and the screw rotors 460, 470. Eventually, the gas (e.g., air) is moved from the inlet port 450 to the outlet 440, where the gas (e.g., air) exits the variable booster device 250, 316 through the outlet 440 formed by the opening 410 on the top side 401 of the main body 400 and the aperture 425 of the sliding plate 420. Thus, as the screw rotors 460, 470 rotate within the interior cavity 412 of the main body 400, the intermeshed threads 462, 472 compress the gas (e.g., air) that enters through the inlet port 450 until the gas (e.g., air) reaches the outlet 440.

Figure 7A:
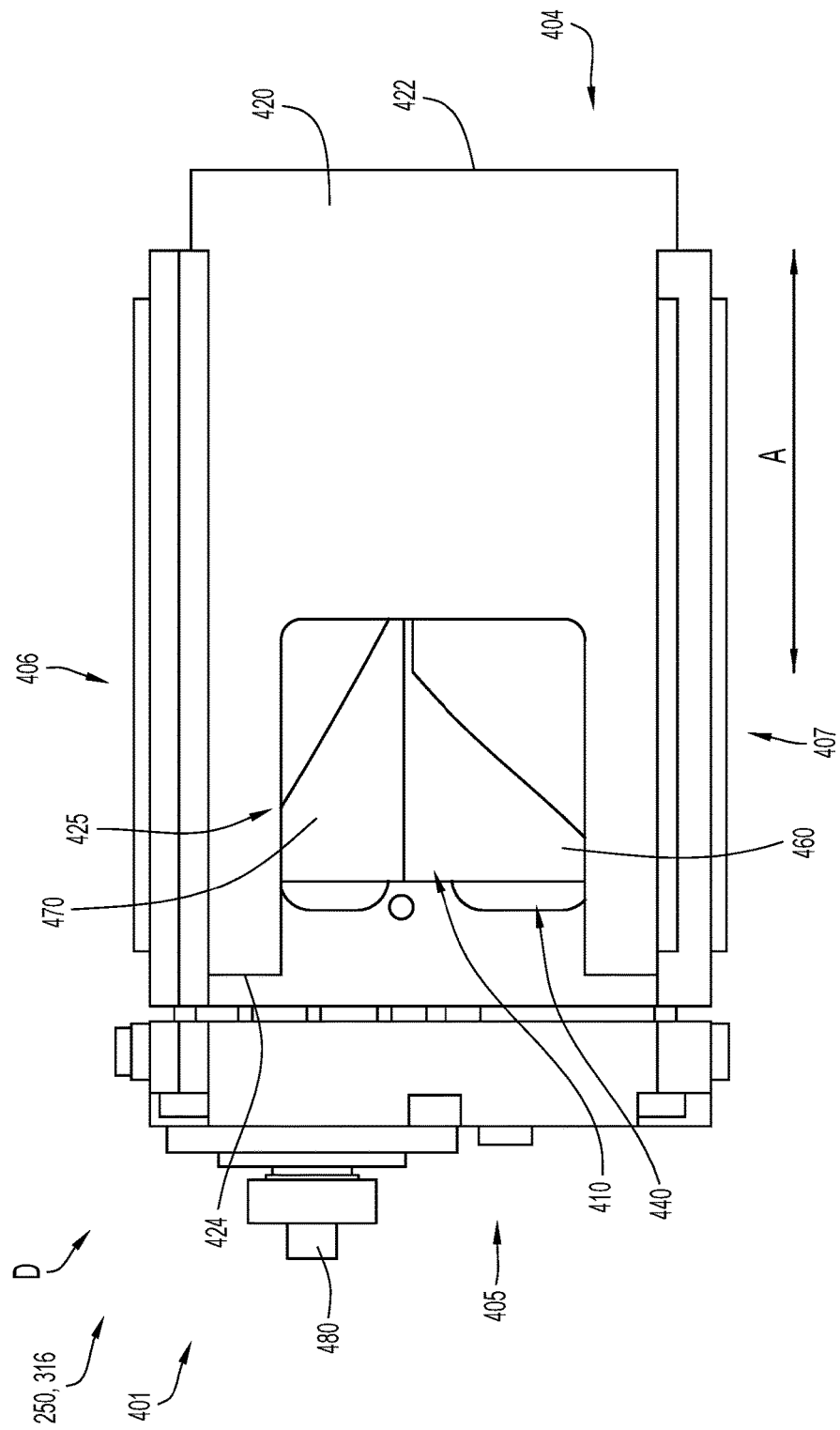
FIG. 7A illustrates a top view of the variable booster device illustrated in FIG. 5, the variable booster device disposed in a low displacement configuration.
Figure 7B:
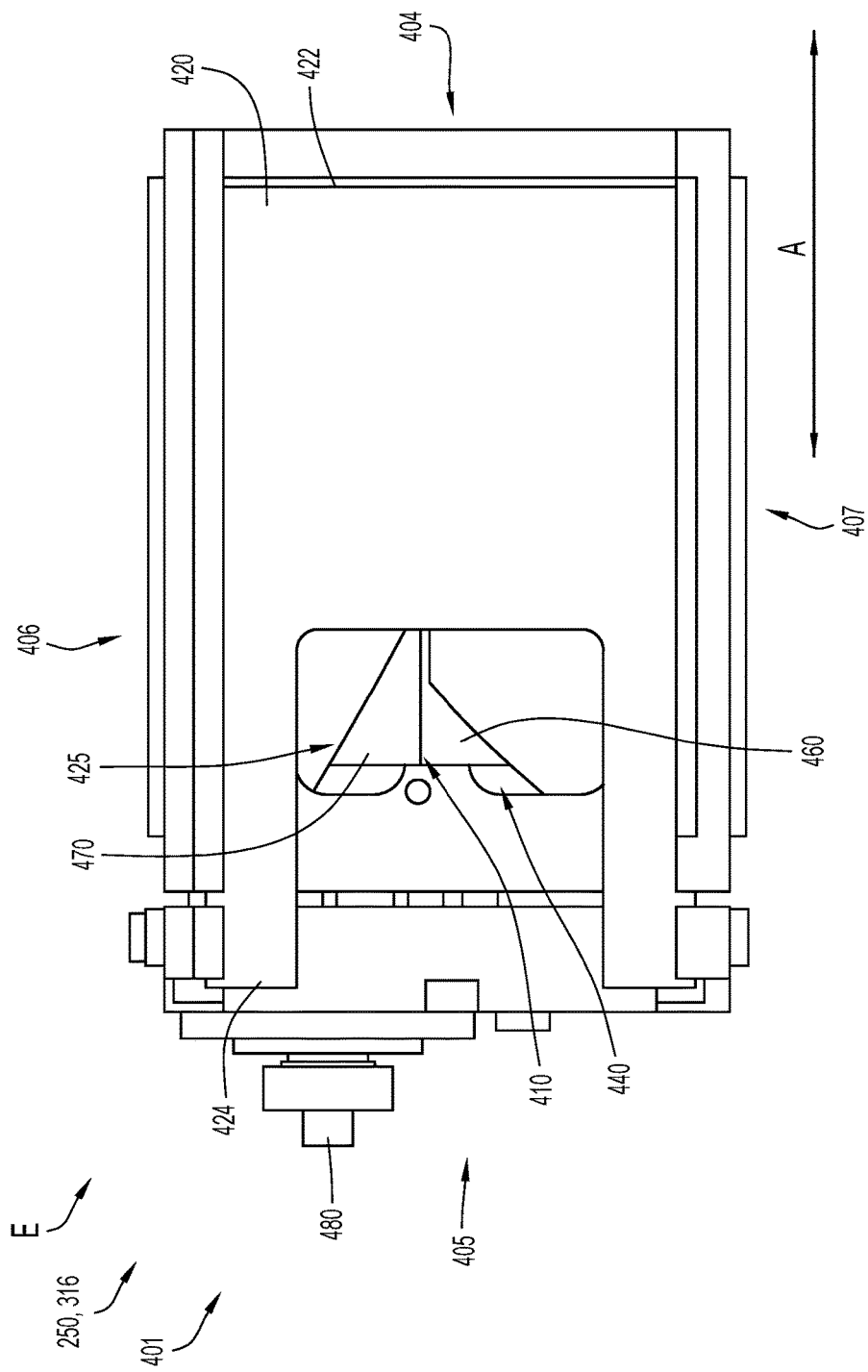
FIG. 7B illustrates a top view of the variable booster device illustrated in FIG. 5, the variable booster device disposed in a full displacement configuration.

Turning to FIGS. 7A and 7B, the main body 400 of the variable booster device 250, 316 further includes a drive shaft 480 extending from the rear end 405 of the main body 400. The drive shaft 480 may be mechanically coupled to one or more of the screw rotors 460, 470 such that rotation of the drive shaft 480 induces rotation of the screw rotors 460, 470. The drive shaft 480 may also be operatively coupled to the CVT of the transfer case 230, 302, where rotation of the axle 120(2) of the motorized vehicle 100 induces rotation of the drive shaft 480, and subsequently the screw rotors 460, 470, when the CVT of the transfer case 230, 302 is selectively engaged with the drive shaft 480.

FIGS. 7A and 7B further illustrate the variable booster device 250, 316, where the sliding plate 420 is in the first configuration D (FIG. 7A) and the second configuration E (FIG. 7B). In the first configuration D, the sliding plate 420 is fully retracted, where the front end 422 of the plate 420 extends forward from the front end 404 of the main body 400, while the rear end 424 of the plate 420 is spaced forward from the rear end 405 of the main body 400. In the second configuration E, the sliding plate is fully extended, where the front end 422 of the plate 420 is disposed rearward of the front end 404 of the main body 400, while the rear end 424 of the plate 420 is spaced proximate to the rear end 405 of the main body 400. The rear end 424 of the plate 420 is spaced farthest from the rear end 405 of the main body 400 in the first configuration D. Furthermore, the plate 420 may be disposed in any number of intermediary configurations between the first configuration D and the second configuration E. The plate 420 slides along longitudinal plane A between the first configuration D and the second configuration E.

When in the first configuration D, the positioning of the sliding plate 420 with respect to the main body 400 locates the aperture 425 over the opening 410 of the main body 400, such that a large portion of the opening 410 of the main body 400 is revealed/exposed. Conversely, when in the second configuration E, the positioning of the sliding plate 420 with respect to the main body locates the aperture 425 over the opening 410 of the main body 400, such that a smaller portion of the opening 410 of the main body 400 is revealed/exposed. Thus, as illustrated, the outlet 440, which is collectively defined by the overlapping of aperture 425 of the sliding plate 420 with the opening 410 of the main body 400, is larger when the sliding plate 420 is in the first configuration D than when the sliding plate 420 is in the second configuration E. The aperture 425, which defines the forward most portion of the outlet 440, is disposed closer to the front end 404 of the main body 400 when the plate 420 is in the first configuration D than when the plate is in the second configuration E. Thus, gas (e.g., air) that enters the variable booster device 250, 316 through the inlet port 450 on the front end 404 of the main body 400 travels a shorter distance within the interior cavity 412 of the main body 400 to reach the outlet 440 when the plate 420 is in the first configuration D than when the plate 420 is in the second configuration E. Because the gas (e.g., air) has to travel farther within the interior cavity 412 of the main body 400 before exiting the variable booster device 250, 316 when the sliding plate 420 is in the second configuration E, the gas (e.g., air) is compressed more (i.e., the gas is pressurized to a higher pressure) by the screw rotors 460, 470 than when the sliding plate 420 is in the first configuration D. As the sliding plate 420 is moved from the first configuration D to the second configuration E, the amount that the gas (e.g., air) is compressed increases. Thus, the gas (e.g., air) is compressed a first amount when the sliding plate 420 is in the first configuration D, and is compressed a second amount when the sliding plate 420 is in the second configuration E, where the second amount is greater than the first amount.

As previously explained, the variable booster device 250, 316 is coupled to the pneumatic device 210 or the air compressor 304, where the variable booster device 250, 316 pressurized the gas (e.g., air) to a first pressurized state prior to the gas (e.g., air) being further pressurized by the pneumatic device 210 or the air compressor 304. The more the gas (e.g., air) is compressed/pressurized by the variable booster device 250, 316 the more braking torque can be applied by the hybrid pneumatic regenerative system 200, 300 to the axle 120(2) of the motorized vehicle 100. Furthermore, the more the gas (e.g., air) is compressed/pressurized prior by the variable booster device 250, 316, the greater the amount of braking energy that can be stored within the accumulator 220, 318. The sliding plate 420 may be positioned in the first configuration D, the second configuration E, or any of the number of intermediary configurations based on the desired braking torque of the operator of the motorized vehicle 100. Thus, when coupled to a pneumatic regenerative system 200, 300, the variable booster device 250, 316 can modulate the braking torque of the motorized vehicle by changing the density of the air (i.e., varying the pressure and amount of the air processed which is proportional to wheel braking torque) delivered to the subsequent stages of compression.

The movement of the sliding plate 420 along the longitudinal plane A, and/or the variation of the speed of screws 460 470 by shaft 480 coupled to the CVT of the transfer case 230 provides an alteration of the braking torque, and may be either manually controlled by the operator of the motorized vehicle 100 or automatically controlled by the controller 240, 340 to alter the braking performance of the motorized vehicle 100 for ride comfort and/or maximum power recovery. If the positioning of the sliding plate 420 is configured to be automatically controlled by the controller 240, 340, then the controller 240, 340 may selectively adjust the positioning of the sliding plate 420 based on the magnitude of brake force requested, the amount of pressure disposed within the accumulator 220, 318, and the motorized vehicle speed (including the rotational speed of the axle 120(2).

As previously noted, the hybrid pneumatic regenerative systems and corresponding methods described above can be utilized with any types, makes or models of motorized vehicles, including on-road vehicles, off-road vehicles, commercial automobiles typically utilized by private consumers, medium to heavy duty military and/or commercial vehicles including, without limitation, medium duty trucks (e.g., refuse trucks, shipping trucks, etc.), buses (e.g., shuttle buses, public transit buses, etc.), construction equipment (e.g., loader, equipment handlers and transporters, etc.), and vehicles with stationary power take-off (PTO) requirements (e.g., utility boom trucks).

The system of the present invention does not require an electric battery or hydraulic fluid, which can significantly increase the weight of the vehicle, particularly for medium to heavy duty vehicles. In addition, the pneumatic drive portion of the system of the present invention is an open system in that the "working fluid" (i.e., air) is obtained (drawn in) from the surrounding environment in which the motorized vehicle is operated and is further exhausted after being used.

It is to be understood that terms such as "left," "right," "top," "bottom," "front," "rear," "side," "height," "length," "width," "upper," "lower," "interior," "exterior," "inner," "outer" and the like as may be used herein, merely describe points or portions of reference and do not limit the present invention to any particular orientation or configuration. Further, the term "exemplary" is used herein to describe an example or illustration. Any embodiment described herein as exemplary is not to be construed as a preferred or advantageous embodiment, but rather as one example or illustration of a possible embodiment of the invention.

Although the disclosed inventions are illustrated and described herein as embodied in one or more specific examples, it is nevertheless not intended to be limited to the details shown, since various modifications and structural changes may be made therein without departing from the scope of the inventions and within the scope and range of equivalents of the claims. In addition, various features from one of the embodiments may be incorporated into another of the embodiments. Accordingly, it is appropriate that the appended claims be construed broadly and in a manner consistent with the scope of the disclosure as set forth in the following claims.

What is claimed:

1. A pneumatic regenerative system for a motorized vehicle, the pneumatic regenerative system being operatively coupled to an axle of the motorized vehicle that rotates when the motorized vehicle is propelled, the system comprising:
   an accumulator that is operable to receive and store pressurized air;
   a variable booster device operably coupled to the axle, where the variable booster device is operable to pressurize air to a first pressurized state during the braking event of the motorized vehicle, and where the variable booster device may vary an amount of air and a degree to which it is pressurized in the first pressurized state; and
   a pneumatic device operably coupled to the axle, the accumulator, and the variable booster device, the pneumatic device operable as an air compressor during the braking event, where the pneumatic device receives the air directly from the variable booster device at a first pressurized state, compresses the air to a second pressurized state, and expels the pressurized air to be stored within the accumulator.

2. The system of claim 1, wherein the variable booster device includes an inlet and an outlet.

3. The system of claim 2, wherein the variable booster device is reconfigurable between a first configuration, where the outlet is a first size, and a second configuration, where the outlet is a second size, the first size being larger than the second size.

4. The system of claim 3, wherein the air is pressurized to a first pressure by the variable booster device when the outlet is in a first configuration and the air is pressurized to a second pressure by the variable booster device when the outlet is in a second configuration, the second pressure being larger than the first pressure.

5. The system of claim 2, wherein the variable booster device comprises a sliding plate operable to reconfigure the variable booster device between the first configuration and the second configuration.

6. The system of claim 3, further comprising:
   a controller logically coupled to the pneumatic device and the variable booster device.

7. The system of claim 6, wherein the controller automatically reconfigures the variable booster device between the first configuration and the second configuration.

8. A variable booster device of a pneumatic regenerative system for a motorized vehicle, the variable booster device being fluidly coupled with a pneumatic device of the pneumatic regenerative system and being operable to pressurize air to a first pressurized state during a braking event of the motorized vehicle, the pneumatic device operable as an air compressor during the braking event, where the pneumatic device receives the air directly from the variable booster device at a first pressurized state and compresses the air to a second pressurized state, the variable booster device comprising:
   a main body having an inlet, an outlet, and an interior cavity, the inlet and the outlet are in fluid communication with the interior cavity; and
   a variable outlet mechanism coupled to the main body and covering the outlet, the variable outlet mechanism being reconfigurable between a first configuration, where the outlet is a first size, and a second configuration, where the outlet is a second size, the second size being smaller than the first size.

9. The variable booster device of claim 8, wherein the variable booster device is configured to pressurize air a first amount when the variable outlet mechanism is in the first configuration and pressurize air a second amount when the variable outlet mechanism is in the second configuration, the second amount being greater than the first amount.

10. The variable booster device of claim 8, further comprising:
    a first helical screw rotor disposed in the interior cavity; and
    a second helical screw rotor disposed within the interior cavity, wherein the first and second helical screws are intermeshed with one another.

11. The variable booster device of claim 10, wherein the first helical screw rotor rotates in a first direction about a first longitudinal axis of the first helical screw rotor, and the second helical screw rotor rotates in a second direction about a second longitudinal axis of the second helical screw rotor, the second direction being opposite of the first direction, where rotation of the first helical screw rotor and the second helical screw rotor compresses the air within interior cavity of the main body of the variable booster device.

12. The variable booster device of claim 10, wherein the pneumatic regenerative system is mechanically coupled to an axle of the motorized vehicle, the pneumatic regenerative system further comprises:
   a transfer case coupling the variable booster device and the pneumatic device to the axle of the motorized vehicle.

13. The variable booster device of claim 12, wherein the transfer case includes a continuously variable transmission.

14. The variable booster device of claim 13, wherein rotation of the axle operates the pneumatic device and drives rotation of the first helical screw rotor and the second helical screw rotor of the variable booster device via the continuously variable transmission.

15. The variable booster device of claim 14, wherein the pneumatic regenerative system further comprises:
   a controller coupled to the transfer case, the variable booster device, and the pneumatic device, the controller automatically controlling the continuously variable transmission to optimize operation of the pneumatic motor and a rotational speed of the first helical screw rotor and the second helical screw rotor of the variable booster device during the braking event of the motorized vehicle.

16. The variable booster device of claim 15, wherein the controller is further configured to:
   automatically alter the configuration of the variable outlet mechanism of the variable booster device during the braking event of the motorized vehicle.

17. The variable booster device of claim 8, wherein the variable outlet mechanism comprises a plate slidingly coupled to the main body.

18. A pneumatic regenerative system for a motorized vehicle, the pneumatic regenerative system being operatively coupled to an axle of the motorized vehicle that rotates when the motorized vehicle is propelled, the system comprising:
   a variable booster device operably coupled to the axle so as to activate the variable booster to pressurize incoming air to a first pressurized state during a braking event of the motorized vehicle, wherein the variable booster device is reconfigurable to vary an amount of pressurization of the air;
   an air compressor coupled to and in fluid communication with the variable booster device, the air compressor operably coupled to the axle so as to activate the air compressor to receive air directly from the variable booster and pressurize the air to a second pressurized state during the braking operation of the motorized vehicle;
   an accumulator that is operable to receive and store pressurized air from the air compressor during the braking operation; and
   a pneumatic motor that receives the pressurized air from the accumulator to activate the pneumatic motor such that, during activation, the pneumatic motor provides energy to the axle during an acceleration event of the motorized vehicle.

19. The system of claim 18, wherein the variable booster device includes an inlet and an outlet, and the variable booster device is selectively reconfigurable between a first configuration, where the outlet is a first size, and a second configuration, where the outlet is a second size, the first size being larger than the second size.

20. The system of claim 19, wherein the air is pressurized to the first pressurized state by the variable booster device a first amount when the variable booster device is in the first configuration and the air is pressurized to the first pressurized state by the variable booster device a second amount when the variable booster device is in the second configuration, the second amount being larger than the first amount.

* * * * *